June 25, 1929.

W. McKENNA

STEAM COOKER

Re. 17,336

3 Sheets-Sheet 1

Original Filed Feb. 10, 1921

Witness:
John Enders

Inventor:
William McKenna
By Fred Gerlach
his Atty.

June 25, 1929. W. McKENNA Re. 17,336
STEAM COOKER
3 Sheets-Sheet 2
Fig. 2. Original Filed Feb. 10, 1921
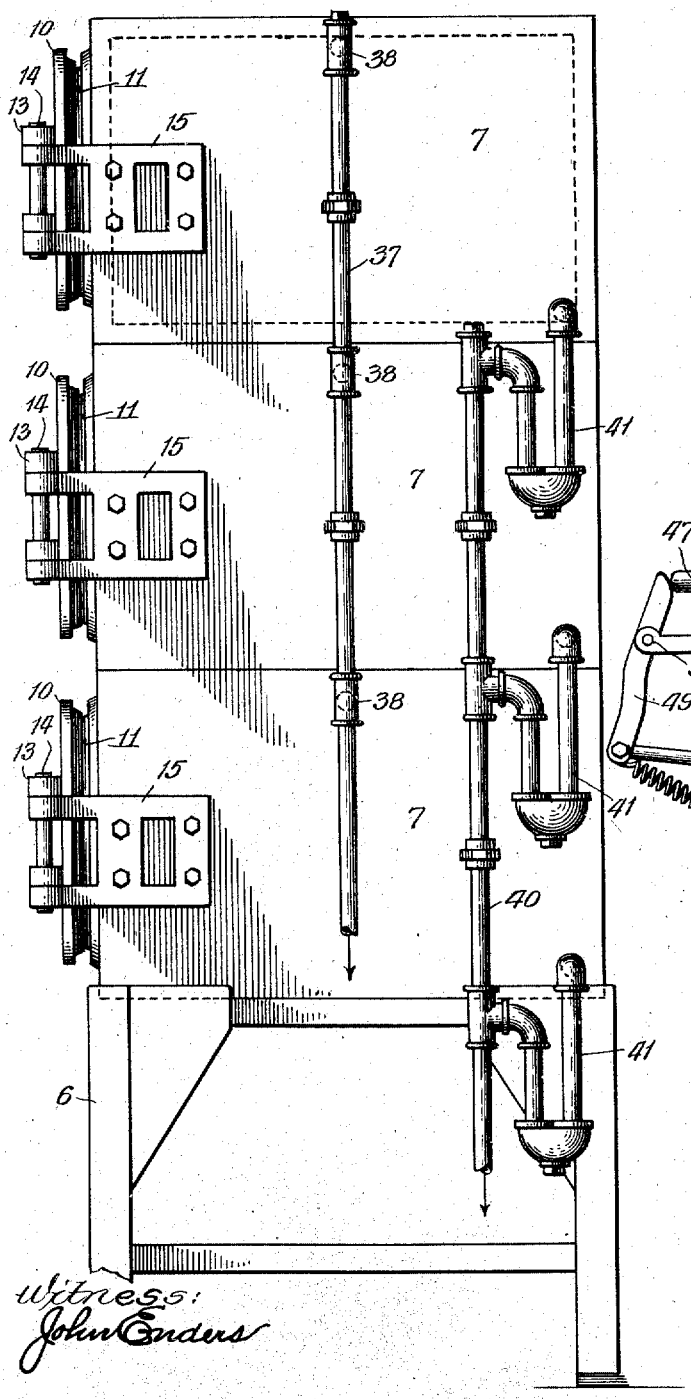
Fig. 3.
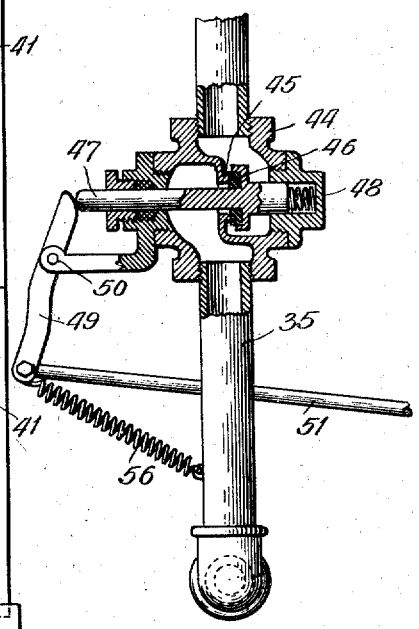
Witness:
John Enders
Inventor:
William McKenna
by Fred Gerlach
his Atty.

June 25, 1929. W. McKENNA Re. 17,336

STEAM COOKER

3 Sheets-Sheet 3

Original Filed Feb. 10, 1921

Witness:
John Enders

Inventor:
William McKenna
by Fred Gerlach
his Atty.

Reissued June 25, 1929. Re. 17,336

UNITED STATES PATENT OFFICE.

WILLIAM McKENNA, OF CINCINNATI, OHIO, ASSIGNOR TO ALBERT PICK & COMPANY, OF CHICAGO, ILLINOIS, A CORPORATION OF ILLINOIS.

STEAM COOKER.

Original No. 1,628,895, dated May 17, 1927, Serial No. 443,794, filed February 10, 1921. Application for reissue filed May 15, 1929. Serial No. 363,376.

The invention relates to culinary steam cookers.

One object of the invention is to provide the cooker with means for automatically cutting off the supply of steam to the cooking chamber when the door is open. In practice, it is objectionable to the cook to have the steam escape when the door is opened and by providing means for automatically cutting off the supply of steam to the chamber when the door is opened, this objection is overcome.

Another object of the invention is to provide means for automatically withdrawing the vessel containing the food from the cooking chamber when the door is opened so that the vessel may be conveniently removed by the cook without likelihood of suffering any burns from contact with the walls of the cooking chamber.

Another object of the invention is to provide improved means for making a steam-tight joint between the door and the walls of the cooking chamber to prevent the escape of steam from the chamber.

The invention consists in the several novel features hereinafter set forth and more particularly defined by claims at the conclusion hereof.

Figure 1:
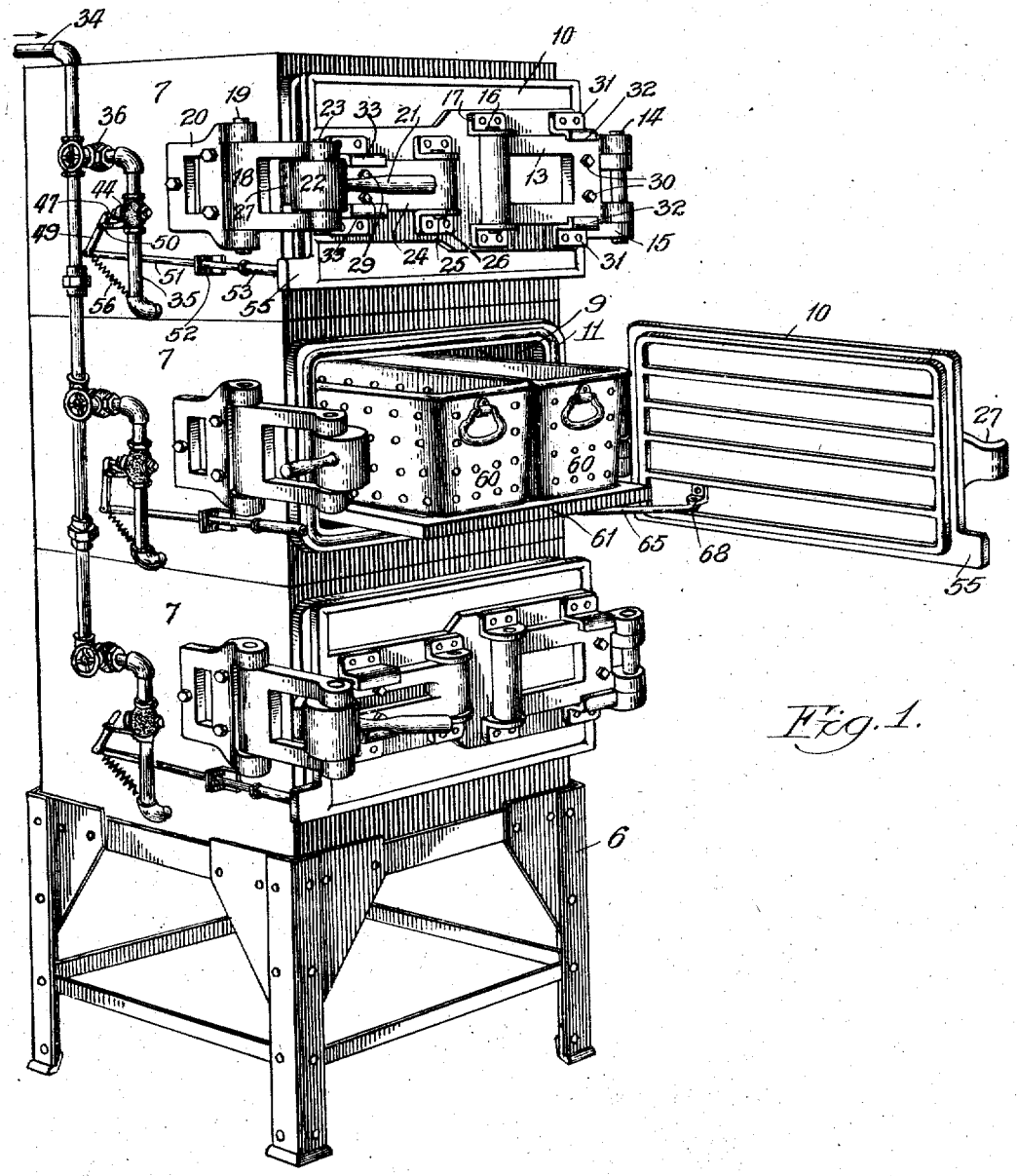
Figure 4:
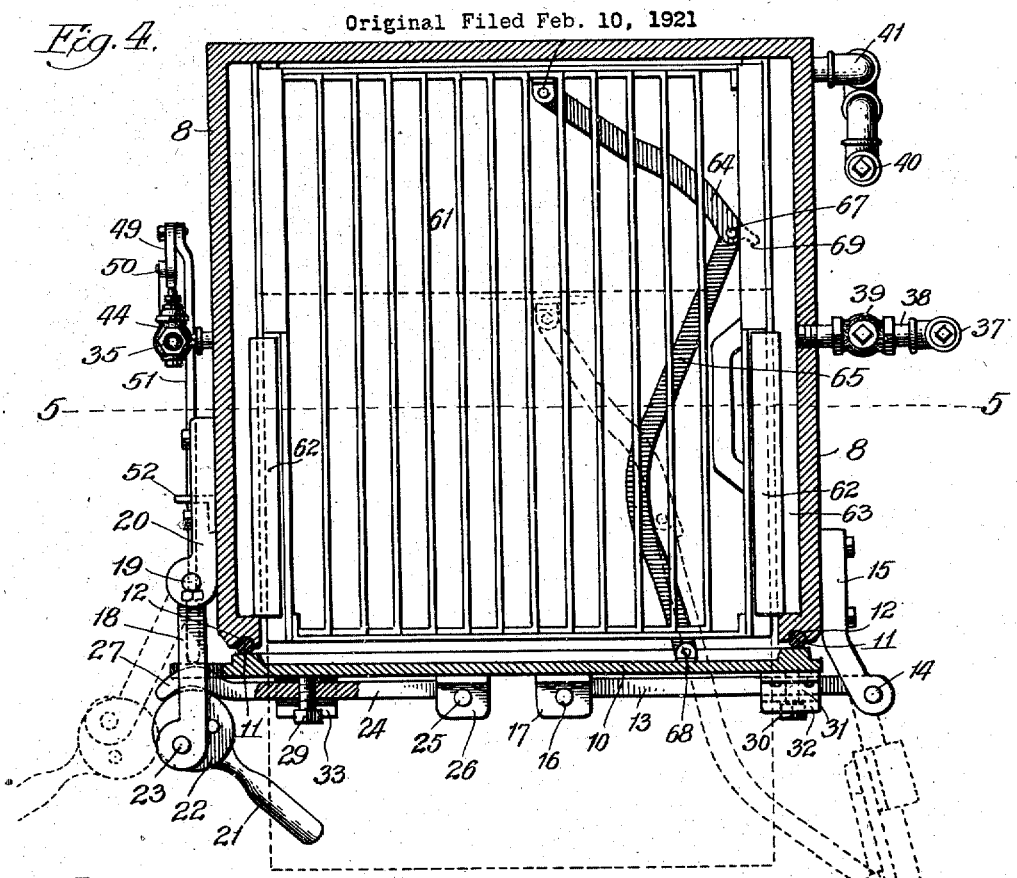
Figure 5:
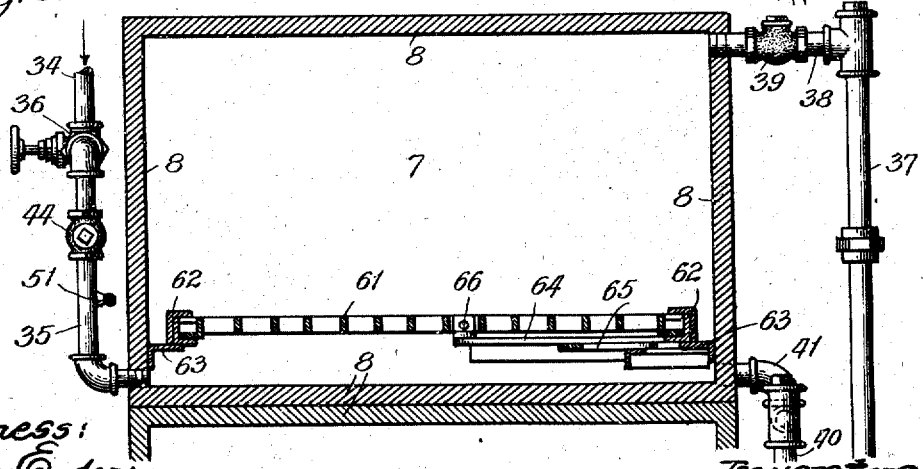

In the drawings: Fig. 1 is a perspective of a cooker embodying the invention. Fig. 2 is a side elevation. Fig. 3 is a detail of the door operated valve for controlling the supply of steam to the cooking chamber. Fig. 4 is a horizontal section of the cooking chamber, and Fig. 5 is a section taken on line 5—5 of Fig. 4.

The invention is exemplified in a cooker comprising a base 6 usually made up of wrought iron and adapted to support one unit or several superimposed units 7 which are alike in construction so that a description of one will suffice for all.

Each unit 7 comprises an oven or enclosing structure consisting of integral back, top, bottom and side walls 8 and provided with a front opening 9 adapted to be closed by a door 10. The inner face of the door is adapted to bear against a gasket 11 held in a groove 12 in the front face of the enclosing structure. This door is supported to swing to one side of the oven. The supporting connection between the door and the oven comprises an arm 13, one end of which is pivoted at 14 in a lug 15 which is bolted to one side of the oven and the other end of which is pivoted, at 16, to lugs 17 which are riveted to the front face of the door. A device for holding the door closed comprises a latch 18 which has one of its ends pivoted at 19 to a lug 20 which is bolted to the other side of the oven and a lever 21 which is provided with an eccentric 22 is pivotally connected to the other end of said latch at 23. The latch 18 permits the lever to be moved bodily into and out of operative relation with an arm 24 which has one of its ends pivoted at 25 to lugs 26 which are fixed to the front of the door and its other end is provided with a concave seat or bearing 27 for the eccentric 22 on the lever 21. In order to cause an equalized pressure of the door against the gasket 11 and prevent the escape of steam from the chamber in the oven, screws 29 are provided in the arm 24 and adapted to be adjusted to engage the door and similar screws 30 extend through the arm 13. By adjusting these screws which examplify adjustable abutments, the pressure of the door against the gasket when the door is secured in closed position, as shown in Fig. 4, will be evenly distributed to prevent leakage of the steam at any point between the oven and the door. Lugs 31 adjacent the top and bottom of arm 13 are provided with stops 32 which limit the movement of said arm relatively to the door. Similar stop-lugs 33 will limit the movement of the arm 24 relatively to the door. When the door is to be released, the lever 21 is swung about its pivot 23 to release the arm 24 and latch 18 and the latter with the lever are swung laterally to the position shown in dotted lines in Fig. 4, whereupon the door will be free to be opened. To close the door, the latch and lever will be reversely operated, the eccentric 22 serving to lock the arm 24 and door 10 in closed position. When the screws 29 and 30 are correctly adjusted, the door will be secured so that no steam will escape from the oven through the joint between the oven and the door.

A steam supply pipe 34 is connected by branches 35 to the units of the cooker. Hand valves 36 are adapted to separately control the supply of steam to the units respectively so that any one of them may be operated independently of the others. An exhaust pipe 37 is connected by branches 38 to all the units of the cooker respectively and is adapted to carry off the excess steam from the cooking chambers. A pressure opened valve 39 is included in each branch 38 so as to retain the desired pressure in the cooking chamber and to permit the excess to escape to the pipe 37. The condensation in the chambers is carried off by a pipe 40 which is connected to each of the units respectively by a suitable drip pipe 41.

A cut-off valve 44 is included in each branch 35 of the steam supply pipe and a connection is provided for automatically controlling each of the valves by the door for the chamber to which the branch leads. This valve 44 is of the self-closing plunger type and comprises a seat 45, a plunger 46 adapted to fit against the seat and prevent the flow of steam through the valve and a stem 47 on the plunger operated so that it will be normally closed by a spring 48. A connection for controlling the valve 44 so that the supply of steam will be discontinued when the door is open and which will be automatically opened when the door is closed comprises a lever 49 pivotally supported at 50 and having one end formed to engage the stem 47, a rod 51 pivoted to the lower end of lever 49, extending through a guide lug 52 and provided at its front end with an adjustable sleeve 53 positioned to be engaged by an abutment 55 on door 10. A spring 56 is applied to operate the connection to release the valve stem 47 when the door is open. As a result of this construction, the door will automatically operate the connection to open the valve 44 and to hold it open as long as the door remains closed and to automatically close the valve whenever the door is open. A characteristic of this device is that the valve will be instantly and completely closed during the initial opening movement of the door. This results from controlling the self-closing valve by an abutment at the free end of the door, so that a slight opening movement of the door will suffice to close the valve.

In practice, employees are frequently burned in reaching into the oven to remove the vessels containing the cooked food from the oven and one feature of the present invention consists in providing mechanism for automatically withdrawing these vessels from the oven to avoid danger of injury to the employee. For this purpose, the vessels 60 containing the food to be cooked are placed on a grid 61 which is slidably mounted in channel bars 62 which are carried by angle bars 63 which are secured to the sides of the oven respectively. A linkage comprising links 64 and 65 serves as a connection between the door and the grid whereby the latter with the vessels thereon will be automatically withdrawn from the oven when the door is opened. Link 64 is pivoted to the grid at 66 and to link 65 at 67. Link 65 is pivoted to the door at 68. A stop 69 is formed on link 64 which renders the linkage rigid between its end pivots after the initial movement in opening the door. As a result of this connection, the grid or vessel support 61 will be operated into and out of the oven by the door. When the door is opened, the grid will project forwardly of the oven as indicated by dotted lines in Fig. 5. As the door is closed, the linkage 64, 65 will operate the support and the vessels thereon into the back of the oven so that when the door is closed the grid will be disposed entirely in the oven, as shown by full lines in Fig. 5. When the door is opened, the linkage will automatically withdraw the grid and the vessel 60 thereon so their front ends will be readily accessible to the operator. By providing automatic connections for shifting the vessel support and for closing the valve for controlling the steam to each oven, the work of the operator is rendered safe because the supply of live steam to the oven is automatically discontinued and the vessels are automatically withdrawn.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a steam cooker, the combination of a structure having a chamber therein adapted to retain steam to heat the products placed therein, and a door for access to the chamber, said door being pivoted adjacent one of its ends, a pipe for delivering steam into said chamber, a self-closing slide-valve in said pipe, adapted to control the entire volume of steam delivered to said chamber, means for securing the door closed, and a device between the door and said valve whereby the valve will be held open while the door is secured closed and instantaneously released so the valve will be automatically and completely closed to entirely cut off the supply of steam during the initial opening movement of the door, said device comprising an element which is entirely separable from the door to permit independent movement of the door after the valve has been closed.

2. In a steam cooker, the combination of a structure having a chamber therein adapted to retain steam to heat the products placed therein, and a door for access to the chamber, said door being pivoted adjacent one of its ends, a pipe for delivering steam into the chamber, a self-closing slide-valve in the pipe adapted to control the entire volume of steam delivered into the chamber, means for securing the door closed, and a device between the door and the valve for holding the valve open while the door is closed, said device comprising a push-rod and a lever which are entirely separable from the door and are adapted to be released during the initial opening movement of the door so that the valve will be automatically closed when the door is opened.

3. In a steam cooker, the combination of a structure having a chamber therein and provided with a door pivoted at one end, a steam supply, means for controlling the supply of steam to said chamber, a vessel-support movably sustained in said chamber, and a connection between said support whereby the latter will be automatically withdrawn from the chamber when the door is opened and moved into the chamber when the door is closed, comprising a pair of links, one of which has one of its ends pivoted to the support and its other end pivoted to one end of the other link, the latter having its other end pivoted to the door, and a stop on one of the links to limit relative movement of the links and render them relatively rigid so they will shift the support during a portion of each movement of the door.

4. In a steam cooker, the combination of a structure having a chamber therein and provided with a door, a steam supply, means for controlling the passage of steam from the supply to said chamber, a pivotal supporting connection between the door and the structure comprising an arm pivoted to the door and to the structure, and an adjustable abutment between the door and the arm, and means for holding the door closed.

5. In a steam cooker, the combination of a structure having a chamber therein and provided with a door, a steam supply, means for controlling the passage of steam from the supply to said chamber, a pivotal supporting connection between the door and the structure, an arm pivoted to the door, means for securing the door closed comprising a pivoted latch and a lever for engaging said arm, and an adjustable abutment between said arm and the door.

6. In a steam cooker, the combination of a structure having a chamber therein and provided with a door, a steam supply, means for controlling the passage of steam from the supply to said chamber, a pivotal supporting connection between the door and the structure comprising an arm pivoted to the door and to the structure, means for holding the door closed, comprising an arm pivoted to the door, and a lever for engaging said arm, and adjustable abutments between the door and said arms respectively.

7. In a steam cooker, the combination of a structure having a chamber therein and provided with a door, means for providing steam for said chamber, a pivotal supporting connection between the door and the structure comprising an arm pivoted to the door and to the structure, means for holding the door closed, comprising an arm pivoted to the door, and a lever for engaging said arm, and adjustable abutments between the door and said arms respectively.

8. In a steam cooker, the combination of a structure having a steam cooking chamber therein, a door for the chamber, a pivotal supporting connection between the door and the structure and means for holding the door closed comprising a movable latch and a pair of arms pivoted on the door and cooperating with the latch and support connection respectively.

In testimony whereof, I have hereunto subscribed my name this 13th day of May, 1929.

WILLIAM McKENNA.